(12) United States Patent
Steiner (10) Patent No.: US 7,980,847 B2
(45) Date of Patent: Jul. 19, 2011

(54) PRODUCTION OF CONSUMABLE SHELL-SHAPED ARTICLES FROM A FATTY MATERIAL CONTAINING CACAO OR A CHOCOLATE-TYPE SUBSTANCE

(75) Inventor: Uwe Steiner, Numbrecht (DE)

(73) Assignee: Buhler Bindler GmbH, Bergneustadt (DE)

( * ) Notice: Subject to any disclaimer, the term of this patent is extended or adjusted under 35 U.S.C. 154(b) by 1093 days.

(21) Appl. No.: 10/543,367

(22) PCT Filed: Dec. 12, 2003

(86) PCT No.: PCT/DE03/04104
§ 371 (c)(1),
(2), (4) Date: Dec. 19, 2005

(87) PCT Pub. No.: WO2004/068963
PCT Pub. Date: Aug. 19, 2004

(65) Prior Publication Data
US 2006/0257517 A1    Nov. 16, 2006

(30) Foreign Application Priority Data
Feb. 4, 2003   (DE) .................................. 103 04 525

(51) Int. Cl.
*A23G 1/21* (2006.01)
(52) U.S. Cl. . 425/407; 425/412; 425/416; 425/DIG. 47; 426/512; 426/514
(58) Field of Classification Search .................. 426/512, 426/515, 514; 425/406–407, 412, 416, DIG. 47, 425/DIG. 112
See application file for complete search history.

(56) References Cited

U.S. PATENT DOCUMENTS

| 3,045,284 | A | * | 7/1962 | Peras ............................. 425/128 |
| 5,558,895 | A | * | 9/1996 | Boyhan .......................... 426/515 |
| 5,635,230 | A | * | 6/1997 | Aasted ........................... 426/512 |
| 5,753,538 | A | * | 5/1998 | Kuno et al. ..................... 249/65 |
| 6,268,006 | B1 | * | 7/2001 | Knobel ........................... 426/515 |
| 6,383,539 | B1 | * | 5/2002 | Akutagawa ................... 426/515 |
| 6,406,733 | B1 | * | 6/2002 | Willcocks et al. ............. 426/515 |

FOREIGN PATENT DOCUMENTS

| DE | 10252633 | 12/2003 |
| EP | 0945069 | 9/1999 |
| WO | WO95/32633 | 12/1995 |
| WO | WO97/49296 | 12/1997 |

* cited by examiner

*Primary Examiner* — Joseph S Del Sole
*Assistant Examiner* — Thu Khanh T Nguyen
(74) *Attorney, Agent, or Firm* — Francis C. Hand; Carella, Byrne, Cecchi

(57) ABSTRACT

The invention relates to a device and a method for producing a consumable shell-shaped article from a fatty material, in particular from the material containing cacao or a chocolate-type material by cold moulding with the aid of a honeycomb cell (2) and a coolable upper plunger (4) which can be lowered into the cell (2). According to said invention, the edge (2*a*) of the cell and/or the edge (4*a*) of the upper plunger is provided with a deformable sealing element (8, 10) which closes a moulding cavity (6) in a tight manner with respect to the outside when said element is pressed against the edge (4*a*) of the upper plunger or against the edge (2*a*) of the cell when the upper plunger (4) is lowered therein. When the upper plunger (4) is introduced into the fluid fatty material at an appropriate temperature in the honeycomb cell (2), a pressure fluid cushion (6*a*) is produced on the edge of the cell and/or on the edge of the upper plunger.

35 Claims, 5 Drawing Sheets

PRODUCTION OF CONSUMABLE SHELL-SHAPED ARTICLES FROM A FATTY MATERIAL CONTAINING CACAO OR A CHOCOLATE-TYPE SUBSTANCE

The invention relates to a device and a method for manufacturing a shell-shaped consumable from a fatty substance, in particular a cocoa-flavored or chocolaty fatty substance.

Such devices or methods, which are also referred to as "cold stamping" when a cooled stamp is used, are known in the art.

In general, work is performed with excess substance, which bleeds out as the stamp is lowered into the alveolus filled with substance between the stamp edge area and the alveolus edge area. This yields a bead with a non-defined shape (see FIG. 1) at the edge of the shell or sleeve comprised of fatty substance formed by this "stamping", whose volume and distribution along the shell edge generally varies from shell to shell, since it is practically impossible to have a completely identical volume of the mold cavity between the stamp and alveolus, a perfectly centered stamp inside the alveolus, and a completely identical metering quantity of the substance metered into the alveolus. While gaseous substances, in particular air pockets, contained in the substance can escape through the still liquid bead in this way, the disadvantage is that the preliminary cooling of the shells must be followed by another step for processing the edge bead, e.g., via cutting, which exposes the shell edge to a strong mechanical stress on the one hand, and necessitates additional steps for again melting the excised excess substance and returning it to the process on the other.

Working without excess substance is also known. In this case, the entire metered quantity of the substance metered into the alveolus is processed, and corresponds to the final weight of the finished shell or sleeve. Substance is here prevented from bleeding out by sealing the alveolus edge area with a sealing plate or sealing ring, which envelops the stamp and is pressed under an elastic force against the alveolus edge ("spring loaded"), thereby forming a completely sealed mold volume. The stamp can move relative to the sealing plate by means of a sealing sliding bearing. Therefore, the stamp moves relative to the sealing plate while "stamping", and forces out the substance previously metered into the alveolus as it moves down ("runs in"), which expands in the now fully sealed mold cavity, completely filling it. Metering quantity tolerances are offset by varying stamp immersion depths. The sealing plate or sealing ring can here have a special inner contour, e.g., according to EP0756455, in order to obtain a shell edge with a special contour (see FIG. 2). While working with a fully sealed mold cavity and completely filling it while stamping makes it possible to work without excess substance, the gaseous pockets, in particular air pockets, contained in the substance can no longer escape. While lifting the stamp after fabricating the shell or sleeve, these gas pockets can end up destroying the latter. In addition, such a mechanical system with sealing sliding bearing is itself quite expensive already. However, even more technical outlay is required to ensure perfect operation of such a cold stamping system (friction on sliding bearing, sealing effect of sliding bearing) under the application conditions that prevail during "cold stamping" (stamp temperature on immersion less than 0° C., temperature of fatty substance on immersion greater than +30° C., material expansions). Even if the sealing sliding bearing operates flawlessly subject to great technical outlay, there danger of gas pockets still persists, possibly with pressure buildup, so that the molded shells can burst when the stamp is subsequently lifted ("run out").

This object is achieved by the device according to claim 1 and the method according to claim 33.

The device according to the invention encompasses an alveolus, whose inner surface determines the outer surface of the shell-shaped consumable, a metering means for filling the alveolus with the fatty substance in a free-flowing, temperature-controlled state, a stamp that can be lowered into the alveolus, whose outer surface determines the inner surface of the shell-shaped consumable to be manufactured, as well as a lowering means for lowering the stamp into the alveolus, wherein one stamp edge area of the stamp and an alveolus edge area of the alveolus abut in the stamp sunk into the alveolus in such a way that the stamp and alveolus define a shell-shaped mold cavity, which is bordered by the outer stamp surface and the inner alveolus surface. According to the invention, the alveolus edge area and/or the stamp edge area now exhibits a deformable sealing means, which seals the mold cavity to the outside when it is pressed against the stamp edge area or the alveolus edge area with the stamp lowered into the alveolus.

The stamp can here in particular be coolable, and the alveolus in particular vibratable.

Due to the deformability of the sealing means, this deformable sealing means can be deformed by the substance that initially becomes distributed in the mold cavity while lowering the stamp and ends up reaching the edge area of the mold cavity and becoming pressurized toward the end of the lowering motion. As a result, the part of the substance that bleeds out into the open from the mold cavity in the prior art described at the outset makes a interstice in the area of the sealing means, being deformed in the process. Despite this deformation by the pressurized substance, the sealing means retains its sealing function, thereby helping to more uniformly distribute the substance in the edge area of the shell formed as a result. At least a portion of potentially present gas pockets in the substance can in this way already get into the area between the surface of the forming shell edge and the deforming surface of the sealing means during the expulsion and distribution of the substance while lowering the stamp. This "gas buffer" or "gas cushion" between the shell edge and the deformable sealing means also helps distribute the substance uniformly in the edge area of the formed shell. The gas volume hence works as a counter-cushion to regulate edge formation, while preventing any substance from getting onto the mold surface outside the mold cavity. In addition, system tolerances can be compensated in the numerous alveolus of an alveolus plate and the numerous stamps of a stamp plate allocated thereto, and during the respective metering process.

The sealing means is preferably elastically deformable. This elastic deformability also helps to make the forming shell edge more uniform.

The sealing means can extend along the circumferential direction of the alveolus opening or stamp periphery, at least in partial areas of the alveolus edge area or stamp edge area. However, it preferably extends annularly along the entire circumference of the alveolus edge area or stamp edge area. This evens out the substance along the entire edge area of the formed shells.

The stamp edge area is best a supporting surface of a flange-like expansion of the stamp that abuts the alveolus edge area with the stamp completely lowered.

The connection between the stamp edge area and the sealing means or between the alveolus edge area and the sealing means can be designed as a non-positive and/or positive connection.

In a particularly advantageous embodiment, the sealing means has a rubbery material. Having at least part of the sealing means consist of a rubbery material imparts an elastic behavior to the sealing means. In this case, the sealing means can expediently consist of a massive, rubbery material, in particular be designed as an O-ring, or as a deformable, in particular toroid hollow part.

In another advantageous embodiment, the deformable hollow part of the sealing means is filled with a fluid. The interplay between the deformability of the hollow part with the fluid contained therein evens out the substance in the edge area of the formed shell in a particularly advantageous manner while stamping. The hollow part can be connected with a fluid source by means of at least one fluid line. This makes it possible to regulate the amount of fluid contained in the hollow part, and hence the fluid pressure, so that the hollow part is more or less "tautly" filled with fluid. The fluid can here be an incompressible fluid, in particular a fluid like water or oil, or a compressible fluid, in particular a gas like air.

The fluid in the hollow part can also have a heat carrier fluid, however. This makes it possible to influence the temperature of the hollow part material, and hence the temperature of the substance forming the edge area of the shell at the end of the lowering motion of the stamp, e.g., to affect the flowing behavior of solidification behavior of the substance in the edge area of the shell. If the fluid in the hollow part contains both a compressible fluid and an incompressible fluid, an optimal supply or dissipation of heat can be achieved in the shell edge area on the one hand, and an optimal elastic behavior of the hollow part sealing means can be achieved on the other.

The sealing means is best situated in a groove-like seat of the alveolus edge area or stamp edge area in a projecting manner, wherein a positive or non-positive connection, e.g., via adhesive bonding or, in the case of an elastic sealing means, in particular by pressing into the groove, is possible.

In another especially advantageous embodiment, at least partial areas of the alveolus edge area and/or the stamp edge area are provided with a volumetric area that can be filled with a gas cushion, wherein the gas cushion acts as a sealing means. This gas cushion can be formed between the sealing means and the forming shell edge, e.g., by gases exiting the substance metered into the alveolus each time during stamping, and help even out the shell edge during its formation. The gas cushion is in particular an air cushion.

In another preferred embodiment, the alveolus edge area and/or the stamp edge area have nozzle-like openings, which are fluidically connected with a compressed gas source. The edge area can be filled with a pressurized gas, e.g., compressed air, through these nozzle openings, thereby again yielding a "gas cushion" or "gas curtain' in the edge area that exerts an elastically sealing effect for the substance metered in during stamping. To this end, at least partial areas along the circumferential direction of the alveolus edge area and/or the stamp edge area best exhibit nozzle-like openings. However, nozzle-like openings are preferably provided along the entire circumference of the alveolus edge area and/or the stamp edge are, ensuring a continuous, annular seal in the entire edge area.

The alveolus edge area and/or the stamp edge area can also have grooved or corrugated recesses, which are fluidically connected with a compressed gas source. At least partial areas along the circumferential direction of the alveolus edge area and/or the stamp edge area best exhibit grooved or corrugated recesses here as well. However, grooved or corrugated recesses are advantageously also provided along the entire circumference of the alveolus edge area and/or the stamp edge area, thereby ensuring a continuous, annular seal in the entire edge area here as well, just as in the preceding paragraph.

In order to ensure as uniform a distribution of temperature on the stamp and in the alveolus as possible, along with a rapid dissipation or supply of heat to the forming shell, the stamp and/or alveolus consist of a readily heat-conducting material.

The stamp and/or the alveolus are best interspersed with channels fluidically connected with a heat carrier fluid source, wherein the heat carrier fluid source is a cooling fluid source in particular.

The alveolus edge area and/or the stamp edge area preferably has rigid elevations, which act as spacers to ensure that a maximum compression of the sealing means is not exceeded at the lower end of the stamp stroke.

The sealing means can be designed as a sealing barrier between the mold cavity and the outside environment of the device. The sealing barrier can here be designed in such a way that the sealing means deforms when a "minimum deformation pressure" acting on the sealing means sets in, and the sealing barrier of the sealing means is overcome if an "minimum overcoming pressure" acting on the sealing means is exceeded. At the end of the stamping process as the stamp is lowered, this allows the gases that exited the substance as it was being distributed in the mold cavity to collect between the forming shell edge and, if necessary in combination with the elastic sealing means, contribute to the evening out of the shell edge described further above. The minimum deformation pressure of the sealing means is here adjusted in such a way that the sealing barrier already begins to deform ("yield") before the stamp has reached its lowermost end position, and even before the gases exiting the substance have reached their maximum compression or maximum pressure. The minimum overcoming pressure of the sealing means is greater than the minimum deformation pressure, and is adjusted in such a way as to overcome ("open") the sealing barrier just a short time after its deformation, once the stamp has reached its lowermost end position, or shortly beforehand, and once the pressure of all gas exiting the substance has further increased up to the minimum overcoming pressure as the result of further compression. This allows the substance to settle or harden before the sealing barrier opens. As a result, a portion of the substance of the shell edge area is prevented from being centrifuged out through the exiting gas while release the gas. This degassing of the mold cavity before lifting the stamp after shell production is complete also reduces the danger of damage (bursting) to the shells, since the stamp stabilizes them during the degassing process.

The method according to the invention involves the following steps: Metering the fatty substance in a free-flowing, temperature-controlled state into an alveolus defining the outer surface of the shell-shaped consumable; immersing a stamp defining the inner surface of the shell-shaped consumable, in particular a cooled stamp, into the free-flowing, temperature-controlled fatty substance in the alveolus, so that the still free-flowing fatty substance becomes distributed in the interstice between the alveolus and stamp that defines the shape and desired volume (=volume at maximum penetration depth and given an undeformed sealing means) of the consumable; and keeping the stamp in its position immersed into the fatty substance for a specific time until the fatty substance has solidified in the interstice.

According to the invention, a pressure cushion is generated in the alveolus edge area and/or in the stamp edge area when immersing the stamp into the free-flowing, temperature-controlled fatty substance in the alveolus. The stamp is preferably cooled ("cold stamping"). This reduces the overall time required for the steps in the method according to the invention, thereby enabling an increased clock frequency during shell production.

The process of immersing the stamp into the fatty substance can be controlled in various ways, e.g., specifically with a predetermined chronological progression of stamping force or stamping pressure in the fatty substance in the interstice, or with a predetermined progression of stamping force or stamping pressure as a function of the penetration depth of the stamp into the fatty substance in the interstice. This controlled stamp immersion helps enhance the reproducibility of shell formation.

As an alternative, the process of immersing the stamp into the fatty substance can be controlled in different ways. For example, the progression of stamping force or stamping pressure, or the speed of the stamp, can be controlled as the stamp is immersed into the fatty substance.

The alveolus can be filled with fatty substance using a slight excess of fatty substance relative to the desired volume. This ensures that enough substance will always be available for the forming shell, despite the ever-present system tolerances. The sealing means according to the invention here distributes the small or large excess of substance to form a uniform shell edge.

The metered in excess fatty substance is preferably greater than the metering quantity tolerance of the desired volume.

The substance metered into the alveolus is best vibrated between the steps of metering in and lowering the stamp by vibrating the alveolus. This vibration of the still fluid substance helps gas pockets such as air to escape the substance.

The method according to the invention can also be performed in such a way that the prevailing stamping pressure while immersing the stamp in the free-flowing fatty substance (stamping force divided by stamp cross section) is greater than the minimum deformation pressure required to deform the sealing means and less than the minimum overcoming pressure required for overcoming the sealing barrier, at least at the end of the immersion motion of the stamp. As a result, the gas cushion in the area of the forming shell edge is retained during the entire stamping process. This makes it possible to set the stamp temperature or stamp cooling along with the immersion time of the stamp in such a way that the forming shell edge has not yet hardened once the lower stamp position has been reached, which helps to even out the shell edge with the gas cushion.

The fluid pressure inside the sealing hollow part or the gas pressure of the gas cushion is advantageously chronologically altered during the immersion of the stamp. For example, the fluid pressure inside the sealing cavity or the gas pressure of the gas cushion can be coupled to the stamping pressure, e.g., by pressurizing the fluid source or gas source using the same power source that also pressurizes the stamp. This ensures that the pressure of the sealing hollow part or the gas cushion is high precisely at precisely the same time that the stamping pressure is high, ensuring that the mold cavity is reliably sealed during the entire stamping process (minimum overcoming pressure always exceeds stamping pressure).

During the immersion of the stamp into the free-flowing, temperature-controlled fatty substance in the alveolus, the stamping force or stamping pressure in the fatty substance in the interstice is advantageously increasingly elevated.

Instead or in addition, the stamping force or stamping pressure in the fatty substance in the interstice can exhibit an oscillating chronological progression during the immersion of the stamp into the free-flowing, temperature-controlled fatty substance in the alveolus. This also helps to purge gas pockets.

Not only can the stamp and/or alveolus be cooled with a cooling fluid, the sealing means can also be cooled with a cooling fluid or heated with a heating fluid. Heating the sealing means makes it possible to keep the edge area fluid longer, or at least in a sufficiently soft state, or again liquefied or softened if need be, after the shell has hardened, thereby enabling or at least facilitating a homogenization of the shell edge by the sealing means.

It is also advantageous to oscillate the fluid pressure inside the sealing hollow part or the gas pressure of the gas cushion, at least toward the end of stamp immersion. This oscillation of sealing means counter-pressure also has a positive impact on evening out the shell edge.

Additional advantages, features and potential applications of the invention may now be gleaned from the following description of some of the possible exemplary embodiments of the device according to the invention for executing the method according to the invention, wherein:

Figure 1:
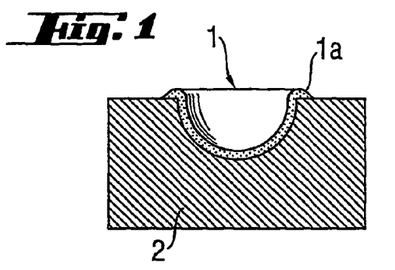
FIG. 1 shows a sectional view of a shell or sleeve manufactured according to prior art.
Figure 2:
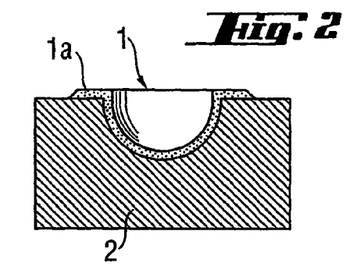
FIG. 2 shows a sectional view of another shell or sleeve manufactured according to prior art.

Chocolate shells or sleeves manufactured according to prior art are shown on FIGS. 1 and 2 in diagrammatic sectional views.

The chocolate substance referred to instead of fatty substance in the description below is merely cited as an example of a fatty substance, specifically a fatty substance with suspended cocoa and sugar particles.

FIG. 1 shows a chocolate sleeve 1 manufactured according to prior art via cold stamping, which sits in an alveolus 2. The sleeve 1 shown here was fabricated via cold stamping with excess substance, and with a mold cavity having an open edge area, yielding a bead-like sleeve edge 1*a* covering the edge of the alveolus 2. Due to the ever-present system tolerances mentioned at the outset, it is practically impossible to achieve a uniform sleeve edge 1*a* along the circumferential direction of the sleeve 1 in this way.

FIG. 2 shows another chocolate sleeve 1 manufactured according to prior art, also via cold stamping, which also sits in an alveolus 2. In this case, the sleeve 1 can essentially be fabricated in two different procedures. Either the sleeve is here formed via cold stamping with excess substance as in FIG. 1, but with additional edge processing, e.g., cutting, or the sleeve is formed via cold stamping without excess substance in a completely sealed mold cavity, which is completely filled with chocolate substance during stamping, wherein the edge area of the mold cavity must have a contour complementary to the desired defined sleeve edge 1*a*. Therefore, an additional step must be implemented to process the sleeve edge 1*a*, or there is a danger that the sleeve 1 just formed via cold stamping will be damaged while lifting the stamp, since any gas pockets contained in the sleeve would be unable to escape in the stamping process.

Figure 3:
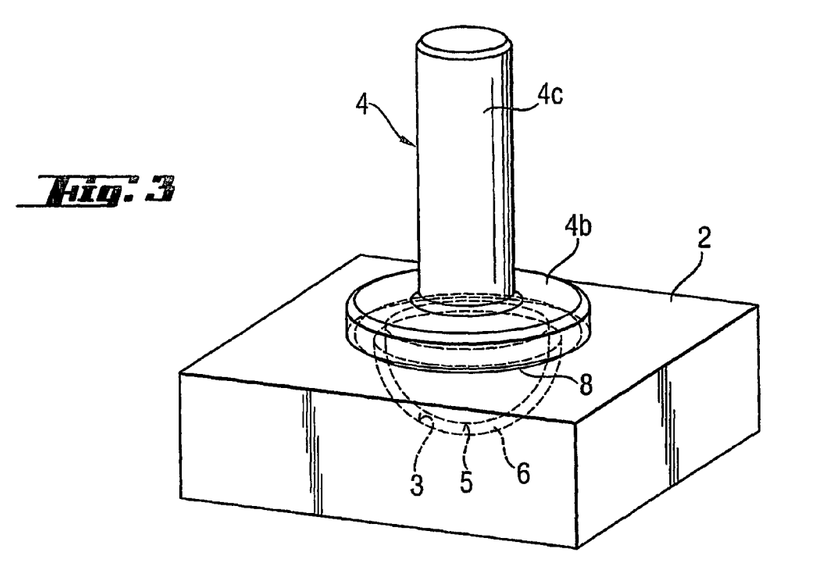
FIG. 3 shows a diagrammatic perspective view of a stamp/alveolus pair of the device according to the invention.
Figure 11:
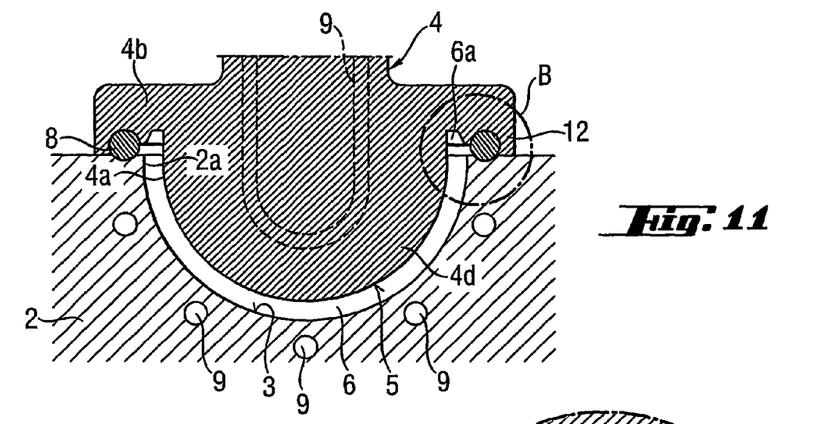
FIG. 11 is a magnified section from the sectional view on FIG. 10.

FIG. 3 is a perspective view of a stamp/alveolus pair according to the invention. The stamp 4 projects into an alveolus 2, defining a mold cavity 6 between the stamp 4 and the alveolus 2 (see also FIG. 7, FIG. 11). The stamp 4 has a flange 4*b*, which non-positively or positively incorporates a toroid sealing means (O-ring) 8, and with which the flange 4*b* abuts the edge of the alveolus 2. The toroid sealing means 8, e.g., consisting of a rubbery material, therefore acts as a deformable spacer to determine the volume of the mold cavity between the stamp surface and alveolus surface, thereby sealing the mold cavity 6 formed between the stamp 4 and alveolus 2 to the outside.

Figure 4:
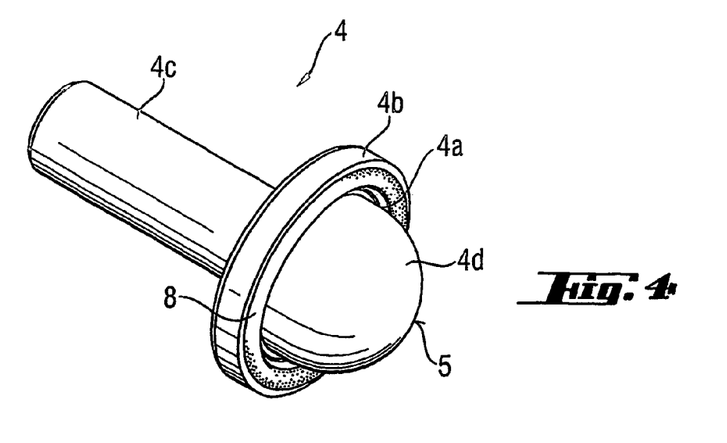
FIG. 4 shows a perspective view of the stamp of the stamp/alveolus pair on FIG. 3.

FIG. 4 is a perspective view of the stamp 4 of the stamp/alveolus pair on FIG. 3. The stamp 4 has a stamp shank 4*c*, through which a coolant, for example, can be circulated via channels (not shown) in the stamp head 4*d* that can be lowered into the alveolus 2. The sealing means 8 designed as an O-ring sits in the surface of the flange 4*b* facing the alveolus.

Figure 5:
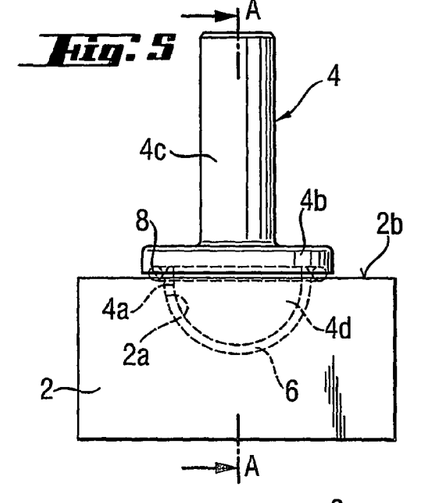
FIG. 5 shows a diagrammatic side view of a first embodiment of a stamp/alveolus pair of the device according to the invention.

FIG. 5 is a side view of a first embodiment of a stamp/alveolus pair of the device according to the invention with stamps 4 maximally lowered into the alveolus 2. The stamp shank 4*c* projects upward, while the stamp head 4*d* extends into the alveolus 2. The (dashed) mold cavity 6 formed between the alveolus 2 and the stamp 4 projecting into it has a precise geometric shape determined by the shape of the stamp head 4*d* and the alveolus, and the chocolate sleeves 1 are molded therein. The stamp 4 the upper alveolus surface 2*b* via the sealing means 8 sitting non-positively and/or positively in its flange 4*b*. The sealing means 8 hence serves as a spacer between the stamp 4 and alveolus 2 that seals the mold cavity 6 to the outside and determines its volume. During operation, the temperature-controlled fluid chocolate substance 1 (see FIGS. 13, 14, 15, 16) is first filled into the alveolus 2, after which the cooled stamp 4 is lowered into the alveolus 2. The chocolate substance 1 is here distributed in the mold cavity 6 and simultaneously cooled, and reaches as far as the upper edge area of the mold cavity 6, more precisely as far as the alveolus edge area 2*a* and the stamp edge area 4*a* of the stamp/alveolus pair, where it finally solidifies and forms the desired chocolate sleeve 1.

Figure 6:
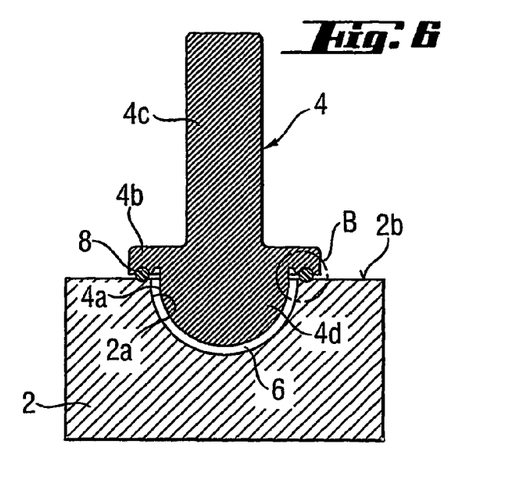
FIG. 6 shows a diagrammatic sectional view of this first embodiment along the A-A plane on FIG. 5.

FIG. 6 is a sectional view of the first embodiment shown on FIG. 5 along the A-A plane. The mold cavity 6 formed between the stamp head 4*d* and alveolus 2 is evident. The dashed circle denotes the edge area B of the stamp/alveolus pair, which accommodates the alveolus edge area 2*a*, the stamp edge area 4*a* and the sleeve edge area 1*a* (see FIG. 13-16).

Figure 7:
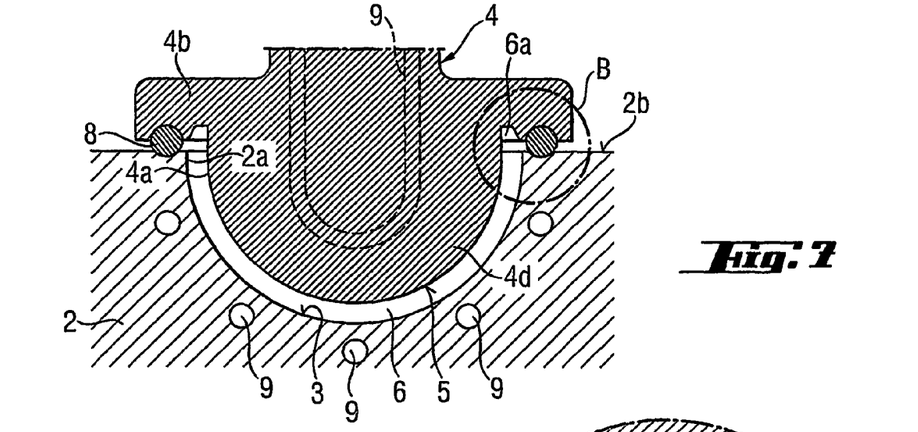
FIG. 7 is a magnified section from the sectional view on FIG. 6.

FIG. 7 shows the lower part of the sectional view depicted on FIG. 6 on a magnified scale. As clearly evident, the mold cavity 6 is defined by the inner surface 3 of the alveolus 2 and the outer surface 5 of the stamp 4. Also evident in the upper edge area B extending around the periphery of the stamp head 4*d* is a corrugated or grooved recess 6*a* in the surface of the flange 4*b* of the stamp 4 facing the alveolus 2. This circumferential groove 6*a* forms the uppermost part of the mold cavity 6. Since the edge area B of the mold cavity 6 is only sealed by the sealing means 8 as the stamp 4 is lowered when the stamp has reached its deepest point or at most shortly before that ("late-sealing edge seal"), any gas pockets potentially present in the fluid chocolate substance 1 can still escape in large part during the displacement phase of the chocolate substance 1. Only the gas pockets still exiting at the very end of the lowering motion of the stamp 4, i.e., after sealing with the sealing means 8 is complete, can no longer leave the mold cavity 6, and get into the corrugated or grooved recess 6*a* as residual gases that exit in the last phase of displacement (see FIG. 8). Since the recess 6*a* extends over the entire circumference of the edge area B, the residual gases can become distributed therein over the entire circumference, forming a gas cushion 10. This ensures a practically complete degassing of formed chocolate sleeves, tangibly reducing the danger of damage to the sleeve 1 after lifting the stamp 4. Also shown here diagrammatically are cooling and heating arrangements in the form of channels 9 for controlling the temperature of the alveolus 2 and stamp 4.

Referring to FIG. 7, the stamp 4 is made of heat conducting material and is interspersed with channels fluidically connected with a heat carrier fluid source, e.g. a cooling fluid source (not shown).

Figure 8:
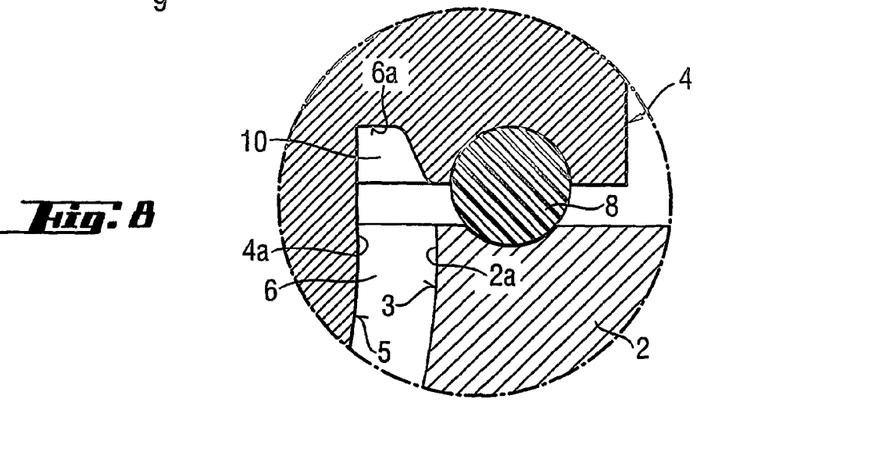
FIG. 8 is a repeatedly magnified section from the circled area on FIG. 6 or FIG. 7.
Figure 9:
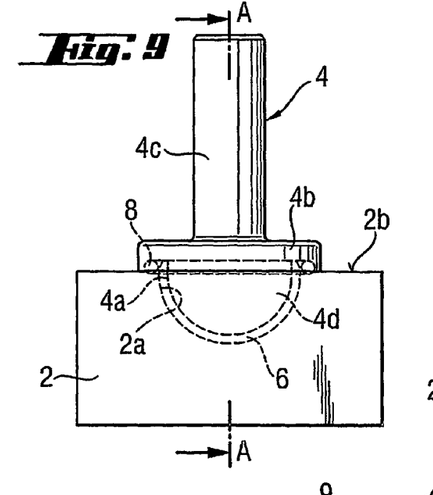
FIG. 9 shows a diagrammatic side view of a second embodiment of a stamp/alveolus pair of the device according to the invention.
Figure 10:
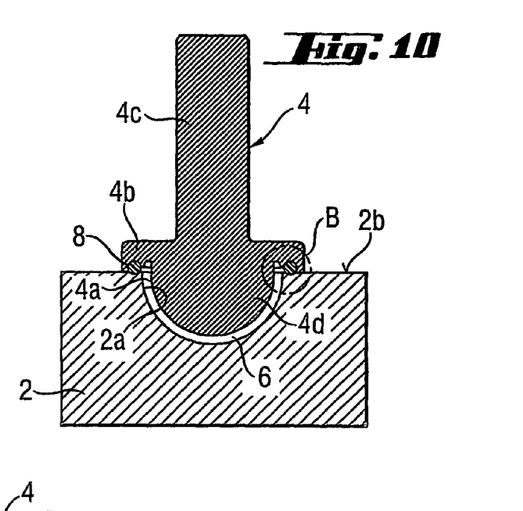
FIG. 10 shows a diagrammatic sectional view of this second embodiment along the A-A plane on FIG. 9.

FIG. 8 is a magnified view of the edge area B circled with a dashed line on FIG. 6 or FIG. 7. During the displacement phase described further above, the increasingly cooled, but still free-flowing chocolate substance (see FIG. 13-16) moves along the inner alveolus surface 3 and along the outer stamp surface 5 until upwardly into the edge area B, where it finally solidifies. Depending on the size and elasticity of the sealing means 8, and on the stamping pressure, in particular in the lowermost area of the lowering area of the stamp 4, the gas pressure in the annular gas volume over the sleeve edge 1 can vary due to the exiting residual gases. At a high enough gas pressure, these residual gases, which exit the solidifying sleeve edge 1*a*, become distributed via the annular groove 6*a*, and form a gas cushion 10, help to even out the solidifying sleeve edge 1*a*.

FIGS. 9, 10, 11 and 12 each correspond to FIGS. 5, 6, 7 and 8 except for a single feature, and show a second embodiment of a stamp/alveolus pair of the device according to the invention. The surface of the flange 4*b* of the stamp 4 facing the alveolus surface 2*b* has rigid elevations 12 radially outside the sealing means, which are distributed along the circumference of the flange 4*b*, and serve as "spacers". This ensures that the stamp 4 will only be immersed to a maximum depth in the alveolus 2, regardless of the stamping pressure exerted and other mentioned system tolerances. As a result, the sleeve 1 does not become too thin at its lowermost point on the one hand, and the volume of the annular groove 6a available for the residual gases does not become too small or even nonexistent on the other, which would prevent the residual gases from being able to escape from the sleeve 1.

Figure 12:
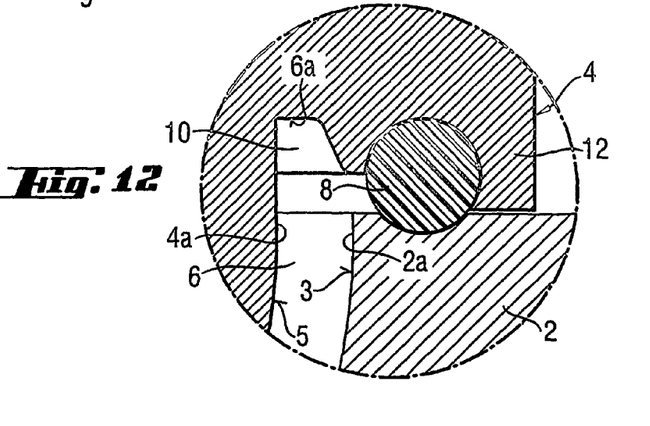
FIG. 12 is a repeatedly magnified section from the circled area on FIG. 10 or FIG. 11.

FIGS. 13, 14, 15 and 16 essentially correspond to FIG. 12. However, the sleeve edge 1a of the chocolate sleeve 1 is additionally shown here, extending between the inner alveolus surface 3 and the outer stamp surface 5, as well as under the annular groove 6a of the mold cavity 6.

Figure 13:
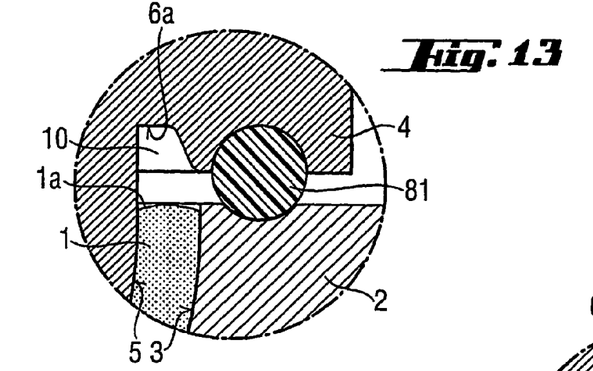
FIG. 13 is a sectional view of the first embodiment corresponding to FIG. 12, with a massive sealing means during operation at the lower end of the stamp stroke.

FIG. 13 shows the edge area B of the first embodiment with a massive O-ring 81, which comprises the sealing means. The deformation and sealing behavior of the sealing means is here essentially determined solely by the elasticity of the sealing material.

Figure 14:
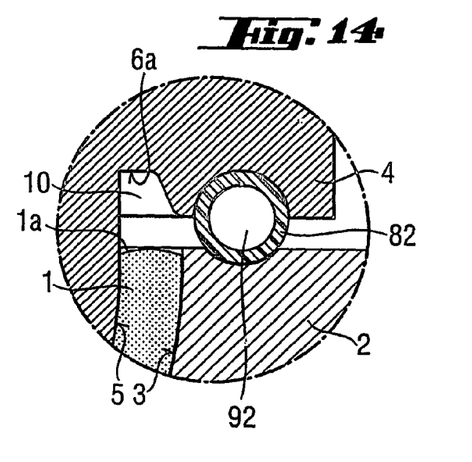
FIG. 14 is a sectional view of a third embodiment corresponding to FIG. 12, with a hollow sealing means during operation at the lower end of the stamp stroke.

FIG. 14 shows the edge area B of a third embodiment with a hollow O-ring 82, which comprises the sealing means. The deformation and sealing behavior of this sealing means is determined not just by the elasticity of the sealing material, but can also be substantially determined by the content of the cavity 92 of the O-ring 82. Possible contents include compressible or incompressible fluids. For example, the cavity 92 can be linked by connecting lines (not shown) to a pneumatic or hydraulic system, in which the pressure buildup in the cavity 92 over time, and hence the "hardness" of the pneumatically or hydraulically exposed O-ring 82 is coordinated with the chronological progression of the stamping pressure during stamping. A function analogous to the function performed by elevations or the spacers 12 in the second embodiment can be achieved, for example, by having the pressure in the cavity 92 achieve a maximum value at the same time that the stamp reaches its lowermost position. The harmonization of the pneumatic or hydraulic "braking effect" with the stamping pressure depends on the pressure in the cavity 92, and on the size of the hollow O-ring 82. Coupling to a pneumatic or hydraulic system also enables the introduction of a vibration into the sealing means, which can also help to even out the sleeve edge 1a.

Figure 15:
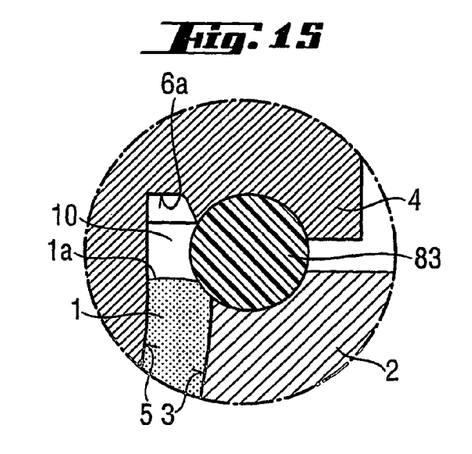
FIG. 15 is a sectional view of a fourth embodiment corresponding to FIG. 12, with a massive sealing means during operation at the lower end of the stamp stroke.

FIG. 15 shows the edge area B of a fourth embodiment, in which a massive O-ring 83 is used, similarly to the embodiment on FIG. 13, but this one is sufficiently large, and arranged closer to the annular groove 6a of the mold cavity 6 than in the preceding embodiments. This enables the chocolate substance 1 being distributed in the mold cavity 6 to come into contact with the massive O-ring 83 during stamping. In light of its elasticity, this massive O-ring 83 helps to even out the sleeve edge 1a, if needed in conjunction with the residual gases collected in the annular groove 6a (gas cushion 10).

Figure 16:
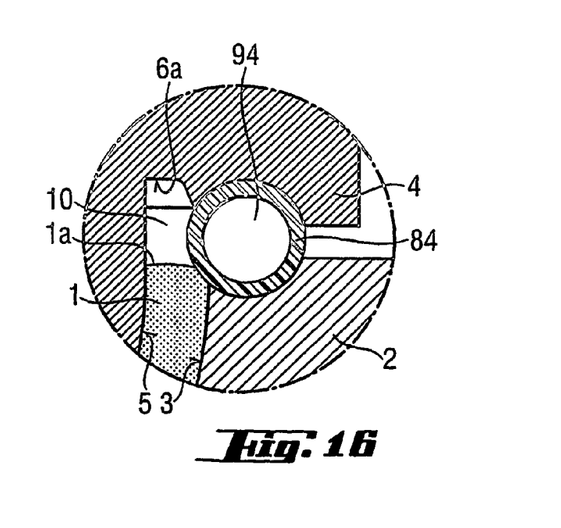
FIG. 16 is a sectional view of a fifth embodiment corresponding to FIG. 12, with a hollow sealing means during operation at the lower end of the stamp stroke.

FIG. 16 shows the edge area B of a fifth embodiment with a hollow O-ring 84 that comprises the sealing means. As in the embodiment on FIG. 14, the deformation and sealing behavior of the sealing means is determined not just by the elasticity of the sealing material, but can also be substantially determined by the contents of the hollow part 94 of the O-ring 84. Possible contents again include compressible or incompressible fluids of a pneumatic or hydraulic system. In addition to the pneumatically or hydraulically assisted sealing and braking during cold stamping, the pneumatic or hydraulic fluid in the hollow part 94 can here be used as a heat carrier fluid. For example, using a hot heat carrier fluid, e.g., hot water or hot steam, makes it possible to again melt or at least soften the forming sleeve edge 1a, thereby facilitating the homogenization of the sleeve edge 1a.

Figure 17:
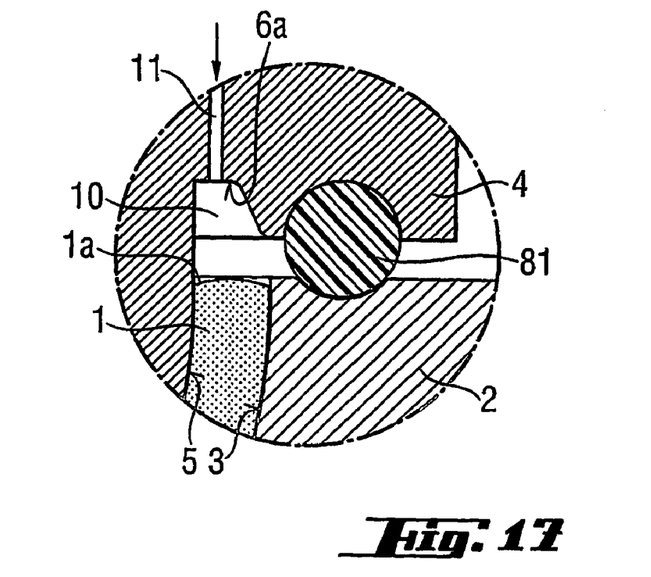
FIG. 17 is a sectional view of a sixth embodiment corresponding to FIG. 12, with a means for generating a gas cushion.

FIG. 17 shows the edge area B of a sixth embodiment with an additional pressure line 11 for generating a variable gas cushion 10 in the area of the annular groove 6a.

Figure 18:
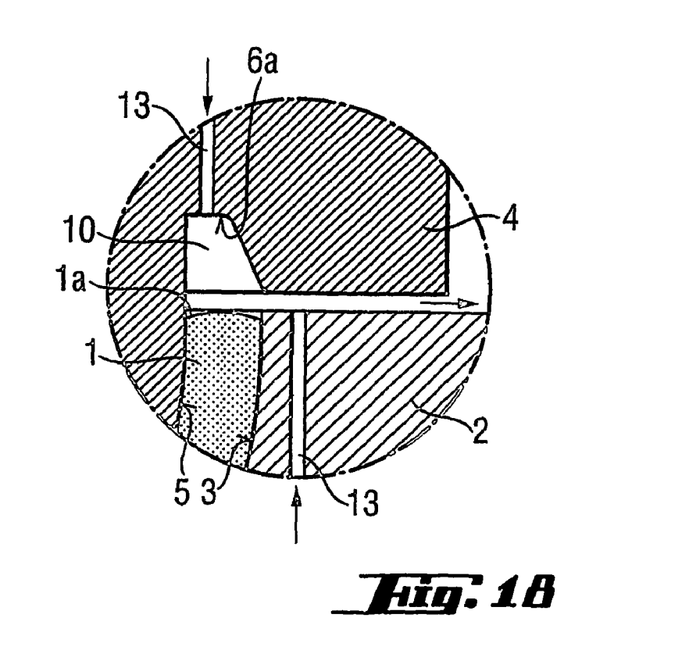
FIG. 18 is a sectional view of a seventh embodiment corresponding to FIG. 12, with a nozzle arrangement forming a gas curtain as the sealing means.

FIG. 18 shows the edge area B of a seventh embodiment, in which the seal is established by means of a compressed air curtain, which can be variably built up in the alveolus 2 and stamp 4 via nozzles 13. A corresponding ram pressure here also generates a gas cushion 10 to influence the shape of the edge area 1a.

Therefore, several elements can help even out the sleeve edge, specifically:

1) Elastic residual gases in the annular groove 6a (FIG. 13, 14, 15, 16);
2) Elastic O-ring 83, in contact with the sleeve edge 1a (FIG. 15, 16);
3) Heated O-ring 83, in contact with the sleeve edge 1a (FIG. 16);
4) Variably elastic or vibrated O-ring (FIG. 14, 16);
5) Variable air pressure of gas cushion 10 (FIG. 17).
6) Variable flow conditions in the area of the compressed air curtain (FIG. 18).

The invention described here based on illustrative examples is not to be limited to these examples. Any variations or similar embodiments are also encompassed. For example, the elevations serving as spacers 12 (FIG. 9-12) could also be secured to the alveolus 2.

REFERENCE LIST

1 Shell or sleeve
1a Shell edge or sleeve edge
2 Alveolus
2a Alveolus edge area
2b Alveolus surface
3 Inner surface of alveolus
4 Stamp
4a Stamp edge area
4b Flange on stamp
4c Stamp shank
4d Stamp head
5 Outer surface of stamp
6 Mold cavity
6a Corrugated or grooved recess
8 Sealing means made of rubbery material
81 Massive O-ring
82 Hollow O-ring, hollow part
83 Massive O-ring
84 Hollow O-ring, hollow part
92 O-ring cavity
O-ring cavity
10 Gas cushion
11 Pressure line
12 Rigid elevations, spacers
13 Nozzle
A Cutting plane
B Edge area of alveolus, stamp and shell or sleeve

The invention claimed is:

1. A device for manufacturing a shell-shaped consumable from a fatty substance comprising
an alveolus whose inner surface determines the outer surface of the shell-shaped consumable to be manufactured;
a metering means to fill said alveolus with the fatty substance in a free-flowing, temperature-controlled state;
a stamp of heat conducting material which can be lowered into the alveolus and whose outer surface determines the inner surface of the shell-shaped consumable to be manufactured, said stamp having channels fluidically connected with a cooling fluid source;

an immersion means for lowering said stamp into said alveolus;

wherein a stamp edge area of said stamp and an alveolus edge area of said alveolus abut each other in such a way with said stamp lowered into said alveolus that said stamp and said alveolus define a shell-shaped mold cavity bordered by said outer stamp surface and said Inner alveolus surface; and a deformable sealing means in at least one of said alveolus edge area and said stamp edge area which seals said mold cavity to the outside when pressed against the other of said at least one of said stamp edge area and said alveolus edge area with said stamp lowered into said alveolus, said sealing means being deformable by the substance bleeding out into the open from said mold cavity while retaining its sealing function.

2. The device according to claim 1, characterized in that said sealing means is elastically deformable, 3. The device according to claim 1 characterized in that said sealing means extends circumferentially at least in partial areas of at least one of said alveolus edge area and said stamp edge area.

4. The device according to claim 1 characterized in that said sealing means extends annularly along the entire circumference of at least one of said alveolus edge area and said stamp edge area.

5. The device according to claim 1 characterized in that said stamp edge area is a supporting surface of a flange-like expansion of said stamp that abuts said alveolus edge area with said stamp completely lowered.

6. The device according to claim 1 characterized in that a non-positive connection exists between said sealing means and said at least one of said alveolus edge area and said stamp edge area.

7. The device according to claim 1 characterized in that a positive connection exists between said sealing means and said at least one of said alveolus edge area and said stamp edge area.

8. The device according to claim 1 characterized in that said sealing means has a rubbery material.

9. The device according to claim 8, characterized in that said sealing means is an O-ring.

10. The device according to claim 8 characterized in that said sealing means is a deformable hollow part.

11. The device according to claim 10, characterized in that said hollow part is torpid.

12. The device according to claim 11, characterized in that said hollow part is filled with a fluid.

13. The device according to claim 11, characterized in that said hollow part is fluidically connected with a fluid source by means of at least one fluid line.

14. The device according to claim 12 characterized in that said fluid is an incompressible fluid.

15. The device according to claim 12 characterized in that said fluid is a compressible fluid.

16. The device according to one of claims 12 to 15, characterized in that the fluid has a heat carrier.

17. The device according to claim 12 characterized in that said fluid in the hollow part contains both a compressible fluid component and an incompressible fluid component.

18. The device according to claim 1 characterized in that said sealing means is incorporated in a groove-like seat of at least one of said alveolus edge area and said stamp edge area in a projecting manner.

19. The device according to claim 1 characterized in that at least partial areas of said alveolus edge area and said stamp edge area have a volumetric area of said mold cavity that can be filled with a gas cushion.

20. The device according to claim 1 characterized in that said sealing means is an air cushion.

21. The device according to claim 20, characterized in that said at least one of said alveolus edge area and said stamp edge area has nozzle-like openings that are fluidically connected with a compressed gas source.

22. The device according to claim 21, characterized in that at least partial areas along the circumferential direction of at least one of said alveolus edge area and said stamp edge area has nozzle-like openings.

23. The device according to claim 21, characterized in that nozzle-like openings are provided along the entire circumference of at least one of said alveolus edge area and said stamp edge area.

24. The device according to claim 20, characterized in that at least one of said alveolus edge area and said stamp edge area has grooved recesses that are fluidically connected with a compressed gas source via channels.

25. The device according to claim 24, characterized in that at least partial areas along the circumferential direction of at least one of said alveolus edge area and said stamp edge area have grooved recesses.

26. The device according to claim 24, characterized in that grooved recesses are provided along the entire circumference of at least one of said alveolus edge area and said stamp edge area.

27. The device according to claim 1 characterized in that said alveolus is made of a readily heat-conducting material.

28. The device according to one claim 1 characterized in that said alveolus is interspersed with channels fluidically connected with a heat carrier fluid source.

29. The device according to claim 28, characterized in that said heat carrier fluid source is a cooling fluid source.

30. The device according to claim 1 characterized in that at least one of said stamp said alveolus has rigid elevations.

31. The device according to claim 1 characterized in that said sealing means forms a sealing barrier between said mold cavity and the outside environment of the device.

32. The device according to claim 31, characterized in that said sealing means begins to deform when a minimum deformation pressure acting thereon is exceeded, and the sealing barrier of said sealing means begins to be overcome when a minimum overcoming pressure acting on said sealing means is exceeded.

33. The device according to claim 1 characterized in that with said stamp lowered into said alveolus a pressure cushion is generated in one of an edge area of said alveolus and an edge area of said stamp during immersion of said stamp into the free-flowing temperature-controlled fatty substance in said alveolus.

34. The device according to claim 1 wherein said stamp has a shank, a head for immersion in said alveolus and receiving said channels therein, a flange between said shank and said head and a recess in a circumferential edge area of said head facing said alveolus for receiving residual gas from the fatty substance to form a gas cushion therein.

35. The device according to claim 34 further comprising rigid elevations on said flange in facing relation to said alveolus to limit immersion of said stamp into said alveolus.

* * * * *

UNITED STATES PATENT AND TRADEMARK OFFICE
CERTIFICATE OF CORRECTION

| | | |
|---|---|---|
| PATENT NO. | : 7,980,847 B2 | Page 1 of 1 |
| APPLICATION NO. | : 10/543367 | |
| DATED | : July 19, 2011 | |
| INVENTOR(S) | : Uwe Steiner | |

It is certified that error appears in the above-identified patent and that said Letters Patent is hereby corrected as shown below:

Column 11, line 47, "torpid" should be -- toroid --

Signed and Sealed this
Twentieth Day of September, 2011

David J. Kappos
*Director of the United States Patent and Trademark Office*